(12) United States Patent
Boys

(10) Patent No.: US 6,868,435 B2
(45) Date of Patent: Mar. 15, 2005

(54) METHOD AND APPARATUS FOR CREATING AND EXECUTING INTERNET BASED LECTURES USING PUBLIC DOMAIN WEB PAGES

(75) Inventor: Mark A. Boys, Aromas, CA (US)

(73) Assignee: Soundstarts, Inc., Aromas, CA (US)

( * ) Notice: Subject to any disclaimer, the term of this patent is extended or adjusted under 35 U.S.C. 154(b) by 0 days.

(21) Appl. No.: 10/357,903

(22) Filed: Feb. 3, 2003

(65) Prior Publication Data

US 2003/0126210 A1 Jul. 3, 2003

Related U.S. Application Data

(63) Continuation of application No. 09/349,640, filed on Jul. 8, 1999, now Pat. No. 6,516,340.

(51) Int. Cl.[7] .............................................. G06F 13/00
(52) U.S. Cl. ..................... 709/204; 709/203; 709/217; 709/219
(58) Field of Search ................................ 709/200, 201, 709/203, 204, 205, 213, 217, 218, 219, 220

(56) References Cited

U.S. PATENT DOCUMENTS

| | | | | |
|---|---|---|---|---|
| 5,310,349 | A | * | 5/1994 | Daniels et al. ............... 434/350 |
| 6,002,915 | A | * | 12/1999 | Shimizu |
| 6,049,806 | A | * | 4/2000 | Crecine |
| 6,149,441 | A | * | 11/2000 | Pellegrino et al. |
| 6,240,443 | B1 | * | 5/2001 | Suzuki et al. |
| 6,295,551 | B1 | * | 9/2001 | Roberts et al. |
| 6,381,645 | B1 | * | 4/2002 | Sassin ........................ 709/227 |

OTHER PUBLICATIONS

U.S. Appl. No. 09/349,640, Mark A. Boys, Priority Claim.
Mark A. Boys, "Method and Apparatus for Enabling Automatic Internet–based Group Lectures Using Public Domain Web Pages," Document Disclosure No. 451963, filed Feb. 26, 1999.

* cited by examiner

*Primary Examiner*—Moustafa M. Meky
(74) *Attorney, Agent, or Firm*—Donald R. Boys; Central Coast Patent Agency, Inc.

(57) ABSTRACT

An Internet-enabled subscription teaching service system has an Internet-connected lecture server executing a software suite, one or more teacher-author stations coupled to the Internet-connected lecture server, having input and display apparatus, and including lecture-authoring software, and one or more Internet-capable lecture client stations having lecture-participation software. Teacher-authors use the teacher-author stations to prepare lectures through the lecture-authoring software, the lecture server stores prepared lectures and provides lectures on a pre-determined schedule to lecture clients at the lecture client stations, and the lecture clients follow the provided lectures at the lecture client stations through the lecture-participation software. Some lectures are fully automatic, and some are directed by the teacher-authors in real time. In the real time case recipients are directed to WEB pages in unison, and annotation and commentary is provided by the teacher-author as pages are visited.

1 Claim, 4 Drawing Sheets

METHOD AND APPARATUS FOR CREATING AND EXECUTING INTERNET BASED LECTURES USING PUBLIC DOMAIN WEB PAGES

This application is a continuation of Ser. No. 09/349,640 filed Jul. 8, 1999 U.S. Pat. No. 6,516,340.

FIELD OF THE INVENTION

The present invention is in the field of interactive on-line communication and has particular application to methods including software for creating and conducting interactive lectures via the Internet or other wide-area network (WAN).

BACKGROUND OF THE INVENTION

The public information network widely known as the Internet is the largest source of quickly accessible information in the world. Anyone with a computer, appropriate Internet access and interactive software (a browser) can access information on virtually any subject, and interact in many ways with other persons.

In recent years, schools such as high schools, colleges, trade schools and the like have begun offering courses, which are accessible on-line by students operating Internet-capable computers. In some cases one may work toward a degree in almost any field without ever entering a classroom. With the appropriate software program installed on a computer, an individual may have access, generally by password, to server-based material offered by a learning institution including review material, quizzes, tests and so on.

In practice, one must log in to a designated server to gain access to required study material. After study material is provided an interactive test is typically offered. Such a server records interaction by students so that teachers and administrators may review, grade, and otherwise track a student's progress.

Interactive study services like those described above, while providing an important service, are somewhat limited in scope and application. One problem is that a student must physically log-in to the service and interact with prepared material. This requires that the student remember a password and, in some cases, coded names for his correct course material. Often, the material has pre-set instructions that the student must follow before properly interacting with the offered material. If the instructions are not clear, or if they are followed incorrectly, a student may become frustrated, or have to start over after many interactions. If a student has questions, typically only e-mail is available for contacting the teacher or administrator of the course.

Another problem with the kinds of on-line education offered in the prior art is that teachers must research and prepare the material according to software conventions, which requires knowledge of computer languages. A teacher that cannot prepare the lessons according to required software convention must have a technician prepare the material and make it accessible. There are many complex routines to deal with for both teachers and students.

As described above, the Internet provides access to information on virtually any subject matter. Similarly, there are many educational Web pages that contain information that would relate to fields covered by institutions of higher learning, high schools, or trade schools. Such WEB pages are often public-domain pages and may generally be copied and used for educational purposes without permission from the creator or host of the page. Virtually any subject that is taught in a learning environment may be found on a WEB page on the Internet. In many instances, there is information available from WEB pages that has not been written in any textbook. Such pages may be accessed via one of a variety of known search tools (browsers) that are also freely available to the public.

What is clearly needed is an educational system wherein educational providers may prepare lectures and the like from existing WEB sources and package them for timed execution such that a plurality of students may learn on-line according to a pre-determined schedule, and in some cases in real time. Such an educational system would eliminate the need for complicated program configurations and pass word log-ins, and provide students with a more disciplined and structured on-line education, while at the same time provide educators with a valuable new tool to disseminate ideas.

A service like that contemplated and taught in the present invention, described in enabling detail below, would use the existing technology of Internet server/client communication, which includes multi-WEB casting capability, and abundant educational information already posted on the Internet, making it possible to obtain and prepare material, using editing tools, and package it to be sent to students having computers with Internet access.

SUMMARY OF THE INVENTION

In a preferred embodiment of the present invention an Internet-enabled subscription teaching service system is provided, comprising an Internet-connected lecture server executing a software suite; one or more teacher-author stations coupled to the Internet-connected lecture server, having input and display apparatus, and including lecture-authoring software; and one or more Internet-capable lecture client stations having lecture-participation software. Teacher-authors using the teacher-author stations prepare lectures through the lecture-authoring software, the lecture server stores prepared lectures and provides lectures on a pre-determined schedule to lecture clients at the lecture client stations, and the lecture clients follow the provided lectures at the lecture client stations through the lecture-participation software.

In preferred embodiments the teacher-author stations are Internet-capable and the lecture-authoring software cooperates with browser software to enable the teacher-authors to search for and browse candidate WEB pages, to enhance and store selected ones of such pages found, to arrange stored product in an order of desired presentation, and to upload a finished lecture to the lecture server for storage and eventual provision of the lecture to the lecture client stations according to the pre-determined schedule. Enhancement may include one or more of masking content, text annotation, attaching audio or video files, or adding graphic elements to the selected page.

In some embodiments the lecture-authoring software further enables the teacher-author to author new pages, and to arrange the new pages in order with the selected WEB pages in creating a lecture. The software may be stand-alone or implemented as a WEB browser plug-in.

In preferred embodiments the Internet-connected lecture server stores prepared lectures and parameters for replaying lectures on the Internet, and accesses and replays stored lectures to pre-determined groups of lecture clients according to the stored parameters. In some cases the lecture server further negotiates with lecture clients for participation in lectures, manages assignment of lecture clients with lectures, and alerts clients as to times for individual ones of the stored lectures. Also in some cases the lectures provided by the lecture server to clients require client interaction with the lectures, and the lecture clients interact through the lecture participation software.

In an alternative embodiment lectures require participation by the teacher-author of the lecture, and while a lecture is played, lecture clients are directed to WEB pages in real time, and while viewing pages to which they are directed interact with the teacher author through the lecture-participation and the lecture-server software.

Apparatus, architecture, and methods for practicing the invention are taught in enabling detail below, providing for the first time a system wherein the Internet may be used to manage lectures having any number of simultaneous participants, using information from Internet-connected servers (WEB pages), and allowing participants to interact with the lecture material, or with a lecturer in a real time situation.

BRIEF DESCRIPTION OF THE DRAWING FIGURES

DESCRIPTION OF THE PREFERRED EMBODIMENTS

According to an embodiment of the present invention, a unique service including enabling software is provided that allows a teacher or other education administrator to create and package self-executing lecture programs using publicly accessible Internet WEB pages. Such lecture programs in a preferred embodiment are designed to execute according to a predetermined time schedule, whereupon they are made available to a plurality of students or other subscribers operating PC's or other Internet-capable equipment connected to the Internet network. The method and apparatus of the present invention is described in enabling detail below.

Figure 1:
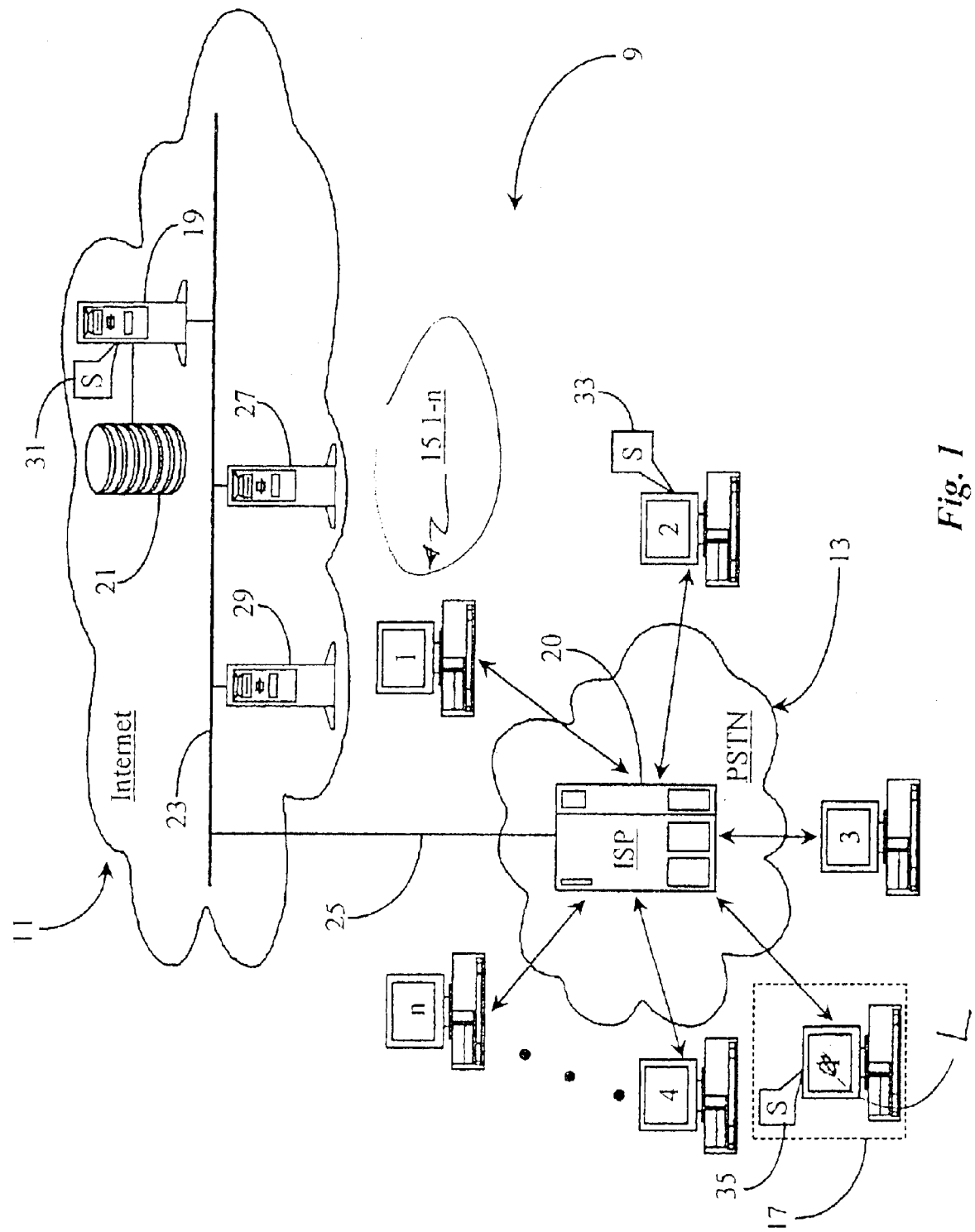
FIG. 1 is a block diagram illustrating an Internet-based lecture system according to an embodiment of the present invention.

FIG. 1 is a block diagram illustrating an Internet-based lecture system 9 according to a preferred embodiment of the present invention. System 9 illustrates an exemplary network architecture wherein the method and apparatus of the present invention may be practiced. System 9 comprises a packet-data network 11, which in this example is the well-known Internet network, and a public switched telephone network (PSTN) 13 through which Internet 11 may be accessed. Internet 11 may be any other data packet network known in the art such as a private wide-area-network (WAN) or a company Intranet. PSTN 13 may be ant other type of connection-orientated-switched-telephony (COST) network such as a private network or the like, and it will be apparent to the skilled artisan that the invention is not limited to any particular means of Internet access. A telephone network is exemplary only.

In this embodiment, the service exemplified by system 9 is Internet-based and may be hosted by any third-party provider such as a school, corporation, Internet-service provider (ISP) or any other interested network or communications provider. Education providers (teachers) and interested individuals (learners) all subscribe to the service and use a software according to embodiments of the present invention implementation to enable practice of the present invention.

Internet 11 has an Internet backbone 23, well-known in the art, illustrated to represent physical connectivity to many varied machines in the network. An Internet server 19, illustrated as connected to backbone 23, represents a main server in an embodiment of the invention adapted to serve pre-packaged lectures. A mass data repository 21 is provided connected to server 19 for the purpose of storing various data and executable software associated with lecturers, and lecture recipients. Such data stored in repository 21 may include, but is not limited to recipient computer addresses, physical addresses, educational records, phone numbers, lecturer's computer addresses, subscriber financial records, pre-packaged lectures and so on. Two illustrated servers 29 and 27, shown connected to backbone 23 represent third-party Internet WEB servers serving WEB-based content such as hyper-text-markup-language (HTML) pages to any Internet-connected user operating a browser application to enable Internet navigation as is known in the art.

Lecture recipients 15 (1–n) are represented by PCs having connected to an ISP 20 situated in PSTN network 13. In this case, all lecture recipient's 15 are using ISP 20 to gain access to Internet network 11. ISP 20 is connected to Internet network 11 by virtue of a data connection 25. Again, other sorts of Internet access may be used, and there is no limitation to a single ISP. It will be apparent to one with skill in the art that recipients 15 1–n may not all be using ISP 20 to gain access to Internet 11. Recipients 15 1–n may be physically distant from one another such as spread over the nation, or in some cases, the world. Moreover, some may have integrated-digital-service-network (ISDN) connections, corporate on-line accounts, wireless connection capability, and so on. The inventor chooses to illustrate one ISP for the purpose of illustrating only one possible and common connection method to Internet 11. There are many other variations that are possible.

A lecture service provider (educator) 17 is illustrated also as connected to ISP 20, but may of course connect by any possible suitable apparatus and protocol. There will typically be many more lecturers such as lecturer 17 participating in the practice of the present invention than is illustrated here. However, the inventor deems that the illustration of one lecturer and the plurality of recipients in this example is sufficient for the purpose of teaching the present invention to the skilled artisan.

Main server 19 has software 31 installed and executing therein to provide functions of server 19 according to an embodiment of the present invention. Such functions include but are not limited to access and management of subscriber parameters stored in repository 21, organizing and executing stored lectures, notifying lecture recipients such as recipients 15 of impending lectures, tracking participation and administrating charges and payment, and so on.

Lecturer 17 has software 35 installed and executing on his/her personal computer which, in this example is labeled "L" for lecturer. Software 35 is, in a preferred embodiment, a browser plug-in that integrates a unique capability of caching and annotating and bundling WEB pages to normal browser function.

Lecture recipient 2 is illustrated as having software 33 installed and executing on his/her PC as well. All other lecture recipients may be assumed to have the same or similar software 33 installed and executing on their respective PC's. Software 33 is, in a preferred embodiment, also a browser plug-in. Software 33 allows lecture recipients to be notified of a scheduled lecture, and transfers browser control to instance 31 in server 19 when a lecture is executing. Other features of instance 33 allow dissemination of varied content that may be inserted and presented in an Internet-based lecture.

In practice of the present invention, lecturer 17 connects to Internet 11 through ISP 20 as is known in the art for the purpose of creating an Internet-based lecture. Lecturer 17 invokes software 35 for tools to create a lecture. Software 35 allows lecturer 17 to search for, access, and cache copies of WEB pages related to any desired subject matter upon which he or she wishes to base a lecture. A mark-up tool kit included in software 35 allows lecturer 17 to annotate and insert added content into a cached copy of any WEB page, as well as to block out undesirable content.

After accessing, caching, and annotating a plurality of WEB pages as a lecture, the annotated copies are bundled together according to lecturer preference and set to a time schedule for execution. In this bundling process the lecturer may also interweave self-composed pages, audio notes, and the like. A completed bundle may then be uploaded over the Internet to server 19 where it is received and stored.

Software 31 at server 19 uses the lecture information provided by lecturer 17 and parameters and other information stored in repository 21 to coordinate delivery of the stored lecture at the appropriate time of execution. Software 31 may send ahead-of-schedule notification to planned recipients of the stored lecture. In some cases notification may include a means for booting up and automatically connecting a recipient to an Internet server such as server 19 for delivery of the lecture. In other instances, a recipient may, if allowed, navigate on his or her own to server 19 and retrieve the stored lecture at his or her convenience.

A pre-packaged lecture may be streamed to recipients such as recipients 15 or may be sent as a compressed executable file (or bundle of files) and be presented off-line at the recipient's location. As a lecture is presented, software 33 allows recipients to perform limited interaction such as note-taking, saving and storing portions of the lecture in a personal (client side) or an on-line (server side) cache for latter review.

In yet another embodiment, a lecturer may use server 19 to stream a real-time lecture wherein recipients may in effect follow-the-leader by virtue of automatic browser control provided by software 31 at server 19. In this case, provision may be made for interactive chat portions of the lecture for question and answer sessions.

The method and apparatus of the present invention may be used by higher-learning institutions, trade schools, recreational guides, conductors of seminars, or by any person authorized (subscribing to) the service. The method and apparatus of the present invention may be used for profit or purely for educational purpose.

The unique method of allowing lecturer's the use of public, and in some cases, commercial WEB pages as basic content for the learning material reduces much work normally incurred through the reading and preparing of material from text books and other physical resources. Since virtually any informative data may be obtained on the Internet, lecturer's using appropriate search tools may quickly assemble and prepare an on-line lecture without leaving their homes and at a time of their convenience.

It will be apparent to one with skill in the art that the method and apparatus of the present invention may be practiced on the Internet with conventional connection technology as described above, or on any other data network capable of transmitting graphics, text, and voice. All that is required is a browser tool enhanced with the software of the present invention a viable network connection capability, and a network appliance capable of displaying and otherwise presenting the information.

Figure 2:
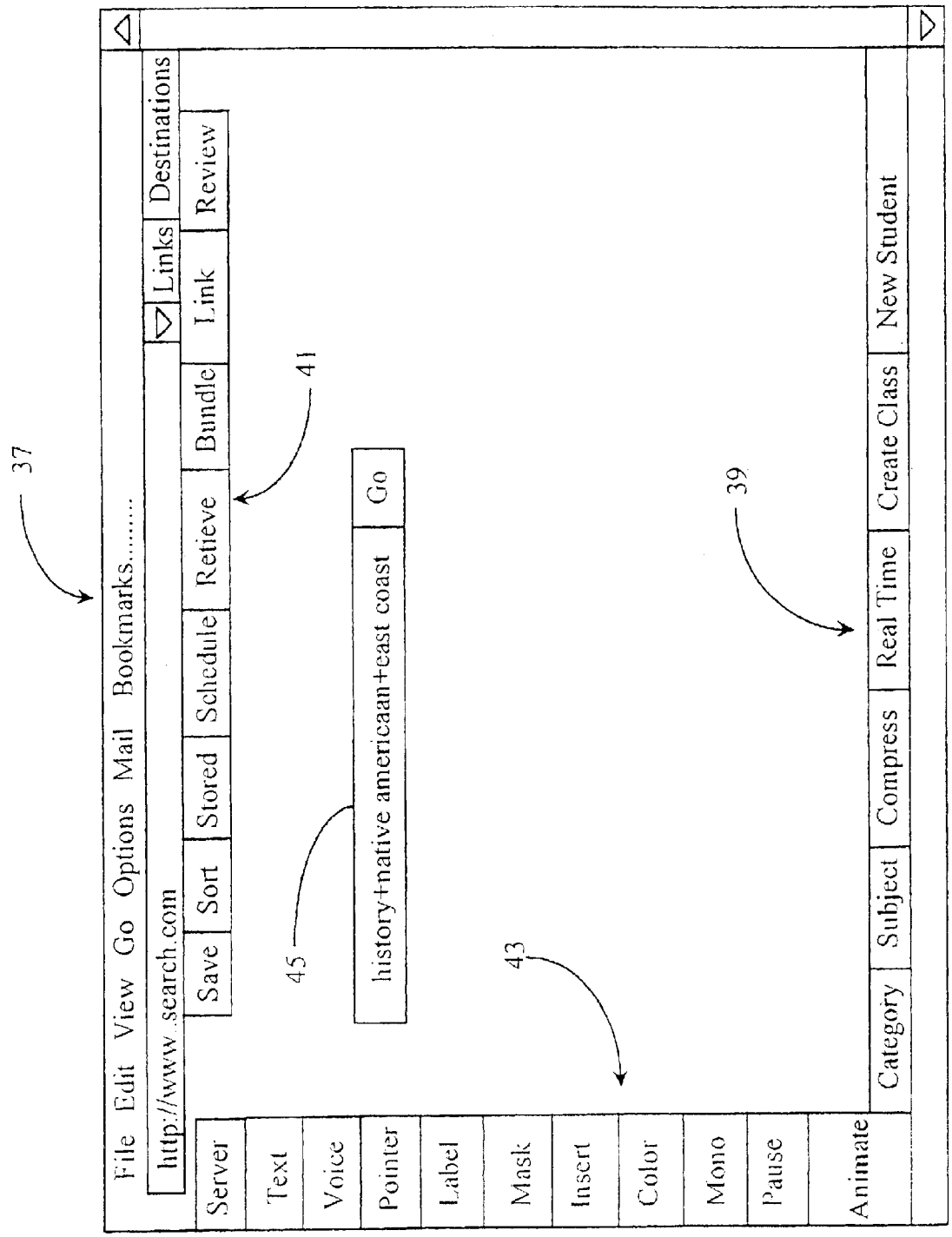
FIG. 2 illustrates an exemplary parent interface according to an embodiment of the present invention.

FIG. 2 is illustrates an exemplary parent interface provided by software 35 of FIG. 1 according to an embodiment of the present invention. A browser display interface 37 is illustrated as an exemplary and enhanced interface as it might appear on a lecturer's PC (FIG. 1) after invoking of software 35.

In this example, browser 37 retains much of it's conventional appearance and function such as having a browser tool bar, an Internet address window, links and destination buttons, and so on, as re known in the art. However, once software 35 of FIG. 1 is invoked, a unique tool bar 43 appears in a convenient location such as along the left side of the browser window as illustrated here. A series of interactive options are made available to a lecturer through tool bar 43. A brief description of exemplary options starting from the top of tool bar 43 and progressing serially down follows.

At the top of tool bar 43 is illustrated a button labeled Server, which is provided and adapted to allow for uploading a completed lecture bundle to an appropriate server such as server 19 of FIG. 1. Upon depressing the server button, an immediate upload may be initiated, or a second window allowing for a selection of available servers for upload may be presented. The server button may also be used for receiving updates or additional tools from a server such as server 19.

A button labeled Text is provided and adapted to allow a lecturer to insert text wording into any place on a cached WEB page, hereinafter termed a lecture page, being annotated. This capability includes insertion of paragraphs or text blocks, margin notes, footnotes, annotations that are coded to open a second window containing the actual text, information balloons, and so on. In one embodiment, an HTML text editor may be invoked to actually enable altering of the original text on the page. Annotation tools also allow font selection and other text effects (bold, italic, underline).

A button labeled Voice is provided and adapted to allow a lecturer to insert audio files into a lecture page. A cached copy of an original WEB page, or lecture page, will typically not include certain content such as streamed audio or video from the original source. To reuse this type of content, a lecturer may first download and save any desired multimedia content to his hard drive, and re-embed a link to it into the cached version of the WEB page, and of course, uploading the content to a server such as server 19. In this way, original multimedia content may be re-used in a lecture. In some cases permission must be obtained from the source of a desired WEB page for linking to added multimedia content to avoid copyright violations and the like.

A button labeled Pointer is provided and adapted to allow a pointer icon such as an arrow or the like to appear at desired locations on a lecture page at desired times during execution of the lecture. Such a pointer may be such as an animated GIF. A button entitled Label provides a function for overlaying existing labels such as may be associated with pictures or the like. This function may be included in the text option and, therefore may not actually appear as a separate function in tool bar 43.

A button labeled Mask is provided and allows the lecturer to mask or block out any undesirable content on a lecture page such as any content that is not to be included in the lecture, or content that would otherwise distract from the lecture. Graphics and text may be masked or blocked out.

A button labeled Insert is provided and adapted to allow a lecturer to insert clipart, pictures, animated GIFs, charts, and other such content into a lecture page. The insert button may also be used in conjunction with other provided subject buttons such as voice or text.

A button labeled Color is provided and adapted to allow a lecturer to adjust or change color parameters of text or graphics on a lecture page. A button labeled Mono renders selected matter such as text or graphic's in the form of black and white or grayscale. A button labeled Pause is provided and adapted for allowing a lecturer to insert a timed pause designated for such as note taking or the like. Invoking the pause button may bring up a blank note page that may be included in the lecture or a created review page that the recipient may interact with and store or send back to server 19. In some instances, a quiz or test page may be inserted into the lecture.

A button labeled Animate is provided and adapted to provide access to pre-prepared animated GIFs or the like that may be re-used by the lecturer. In one embodiment, the animate button may also provide a separate tool kit for creating such GIFs. It will be apparent to one with skill in the art that a tool bar such as tool bar 43 may contain additional or fewer options than are illustrated herein without departing from the spirit and scope of the present invention. It is intended by the inventor that tool bar 43 be construed as exemplary only of the functionality and tooling capability afforded to a lecturer through software 35 (FIG. 1).

A second tool bar 39 is provided and illustrated as displayed across the bottom of browser window 37. In general, tool bar 43 contains annotation and editing functions. However, tool bar 39 contains other functions, some of which are used in conjunction with the server function of tool bar 43. Options presented in tool bar 39 are described serially from left to right.

As part of a search option, a button labeled Category allows a lecturer to choose from a database filled with broadly defined lecture categories to narrow subject matter during a WEB search for pages generally falling within the category. For example, a broad category might be History. A button labeled Subject is provided and allows the lecturer to choose from a wide variety of subjects associated with any chosen category to further narrow a search for material. For example, if a broad category is History, then an associated subject might be Native American. Additional parameters may be entered to further narrow the search. A search window 45 (not part of tool bar 39) is provided and located above tool bar 39 and to the right of tool bar 43. Tool bar 45 displays the search parameter examples given in reference to the category and subject buttons. The additional parameter mentioned happens to be East Coast in this example. Any results will be WEB pages having to do with the History of Native Americans of the East Coast. Still additional parameters may be entered to further narrow a search for lecture material.

In one embodiment, search engine known such as Altavista™ or Excite™, which are popular search engines, may be used. The inventor simply notes that a special WEB search engine may be provided that is tailored to returning results that are educational in nature, and therefore more likely to be usable for lecture material. In some cases, a special on-line database may be created to contain links to known on-line educational references such as libraries or other research facilities. A link to such a database may be made available in one of the illustrated tool bars. Such a search engine and database described above may be hosted by a third party and made available through a providing service to those subscribers practicing the present invention.

A button labeled Compress is provided and adapted to allow a lecturer to compress a lecture for faster uploading to a server such as server 19 of FIG. 1. In this case, the compress function may be used in conjunction with the server button in tool bar 43.

A button labeled Real Time is provided and adapted to allow a lecturer to conduct a lecture in real time such that lecture recipients see pages as they are being annotated. In this case, a server such as server 19 would be used to stream the lecture directly to recipients as it is being conducted without storing it. In another instance, a lecturer may open a chat connection in server 19 or an associated server dedicated for the purpose. Recipients would be instructed to open their chat programs and join the chat. As lecture pages are streamed to recipients, the lecturer may discuss them in the chat and hold discussions in a f follow-the-leader format. In this way, the lecturer may conduct a lecture without necessarily editing the WEB pages. Simple text instruction appearing in recipients chat windows would direct recipients to which portions of a lecture page to pay attention to and which portions to disregard. This feature may also allow a lecturer to control a special on-screen cursor displayed to all lecture recipients. The lecturer may direct recipients attention to different points in a page by use of the cursor.

A button labeled Create Class is provided and adapted to allow a lecturer to choose which recipients will receive a lecture. For example, if the lecturer is a teacher teaching an on-line class then he may hold a special lecture for a select portion of his class for, perhaps extra credit, or the like.

A button labeled New Student is provided and adapted to allow the lecturer to configure a new student into his on-line class. If the lecturer is a public speaker, and recipients are a revolving body of one-time participants representing the general public, then temporary software may be made available to such recipients for one-time use to subscribe to the lecture. Such an example might be that of a real-estate seminar or the like. There are many varied possibilities. In another alternative all class organization is managed by server 19 (FIG. 1), and there may be a lecture review system allowing potential users to preview an offered lecture before opting to become a recipient of the lecture. Fees for students may also be handled by server 19 through any of several transactional methods on-lie (credit cards, deposit accounts, et al.)

A third tool bar 41 is provided and illustrated as located across the top of browser window 37. Tool bar 41 contains options related to packaging and bundling a completed lecture. The options presented in tool bar 41 are described serially from left to right.

A button labeled Save is provided and adapted to allow a lecturer to save edits made to a lecture page. The save button may also allow a lecturer to save any other elements of the editing process such as created GIFs, elements from previous pages that may be inserted to subsequent pages, and so on. A button labeled Sort is provided and adapted to allow a lecturer to sort lecture pages by any desired order or criteria. Lecture pages are renumbered as necessary to amend the serial order desired for presentation.

A button labeled Stored allows a lecturer to browse through any stored material created and saved, or simply saved that may be re-used. Such storage may be an on-line storage dedicated for the purpose. In one embodiment, a certain amount of on-line storage may be made available to lecturers participating in the service as part of the service. In another embodiment, material may simply be stored at the location of the lecturer such as on a non-volatile storage device connected to his or her PC.

A button labeled Schedule is provided and adapted to allow a lecturer to apply a time schedule to a completed lecture. A button labeled Retrieve is provided and adapted to allow a lecturer to retrieve any stored material including a completed lecture that may be stored in server 19. An instance wherein a lecturer may retrieve a stored lecture may be to add new material before the time deadline, or to generally update a lecture. In another instance, a lecturer may change his mind about scheduling or recipient parameters, and may retrieve a lecture in order to alter those parameters.

A button labeled Bundle is provided and adapted to allow a lecturer to link a lecture together in a bundle or package such that it executes according to timed fashion and pre-determined order. In some instances, a bundle will include lecture pages that are re-displayed for review, or other purposes. In such instances the re-used page need not be provided in duplicate, but simply re-streamed via instruction in the bundle.

A button labeled Link is provided and adapted to allow a lecturer to provide links to audio, video, other pages not included in the bundle, and so on. A button labeled Review allows a lecturer to review edited portions of a lecture including playing any audio or multi-media associated with the lecture in order to test it's presentation and effectiveness.

It will be apparent to one with skill in the art that the appearance of options in browser window 37, such as in the tool bars described above, may be widely varied. For example, instead of tool bars, pull-down menus may be used. In one embodiment a separate tool panel is presented outside of the browser window. Moreover, additional enhancement such as special keyboard functions for initiating certain commands or the like may be applied. There are many possibilities. Software 35, as a browser plug-in, is intended to afford a lecturer with complete control in the creation and packaging of an on-line lecture.

In another embodiment lecturers, rather than connecting on-line to prepare and upload lectures, may be knowledge workers at or near the site of server 19, and may be connected to server 19 through, for example, a local area network (LAN), or some other sort of data network other than the Internet. In this embodiment server 19 may be a part of a comprehensive educational server system dedicated to knowledge dissemination (cyber-teaching).

In some embodiments it is not necessary that the recipient have special software. The recipient in this minimal embodiment connects to the Internet, browses to the service of server 19, and selects a lecture or lesson plan. The server may negotiate time, fees and the like with the potential recipient, and then the lecture is presented. The recipient in this case is a passive follower.

Figure 3:
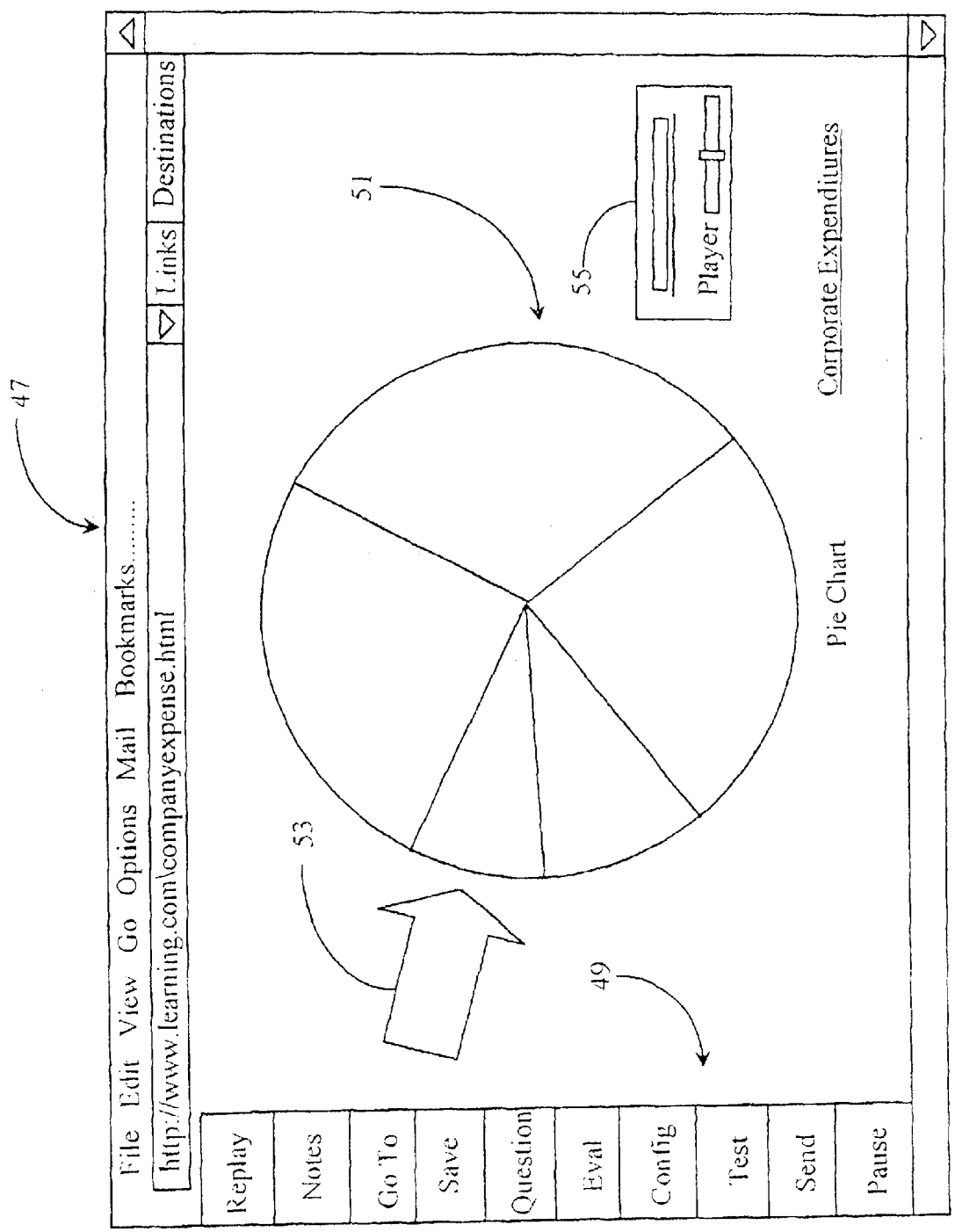
FIG. 3 illustrates an exemplary client interface according to an embodiment of the present invention.

In a preferred embodiment the recipient may be more interactive. FIG. 3 is an exemplary client interface enhanced by software 33 of FIG. 1 according to an embodiment of the present invention. A browser interface 47, hereinafter termed browser window 47, is illustrated as it might appear to a lecture recipient. Browser window 47 appears much as a normal browser window known in the art including such as retaining normal browser options and the like as was described with browser window 37 of FIG. 2. However, once software 33 is invoked on a recipients PC, a tool bar 49 appears presenting certain options to a recipient receiving a lecture from a server such as server 19 of FIG. 1.

In this example browser window 47 contains a presented lecture page 51 from an exemplary lecture provided by server 19, illustrating a pie chart breaking down corporate expenditures. Such a page may be part of a lecture on corporate financing available through an on-line economics class, for example. On page 51, an animated GIF in the form of a pointer arrow is shown pointing to a certain section of the pie chart while an audio player 55 is describing the pie chart. The player interface may be hidden rather than displayed as shown. Such multimedia content may be associated to a lecture and streamed in time of presentation of a specific lecture page pertaining to the multimedia.

There are a variety of ways that a lecture recipient may participate in (interact with) a lecture. In one embodiment, a notification of an impending lecture indicating the time and description of the lecture is sent to potential recipients ahead of the scheduled lecture time. This may be accomplished by e-mail, pop-up notification if the user is on-line, automated phone or fax, and so on. After receiving notification, a user may log-on to an appropriate lecture server such as server 19 of FIG. 1 at the scheduled time to participate in the lecture.

In one embodiment, means for automatically booting a recipient's PC and logging him or her into server 19 for the purpose of receiving a lecture is provided. In this push embodiment, software 31 at server 19 takes full control of some or all of recipients' computers at lecture time. For example, if a user is already on-line surfing an unrelated WEB site, software 31 takes control of browser 47 and immediately navigates to the appropriate server address at the start time of the impending lecture. A pause period may be afforded to recipients such that they may save any work that they were engaged in on their PC's before control is relinquished, and users may also have veto power.

In a preferred embodiment, a lecture server such as server 19 of FIG. 1 takes full control of browser window 47 during a lecture. Lecture pages automatically display according to a pre-determined ordered and timed fashion. Any multimedia associated with a lecture automatically invokes the appropriate player applications for receiving and playing the media.

Referring back to FIG. 3, tool bar 49 contains certain options which are made available to recipients during an active lecture session. These options are described serially top to bottom as follows.

A button labeled Replay is provided and adapted to allow a lecture recipient to save and replay portions of or all of a lecture after it has been presented. A button labeled Notes is provided and adapted to allow a lecture recipient to call up a blank page during a lecture for the purpose of entering any text notes that are desired. Such a note page may be linked to the subject matter inspiring the notes such that during replay of the lecture, the notes may be viewed next to the appropriate lecture page. Such linking may be automatic.

A button labeled Go To is provided and adapted to allow a lecture recipient to navigate to a specific portion or page in a lecture after it has been presented and is being reviewed by a recipient. A button labeled Save is provided and adapted to allow a lecture recipient to save all of or any portion of a lecture to a local file.

A button labeled Question is provided and adapted to allow a lecture recipient to send an on-line question to a lecturer. Such a question may be sent in the form of an e-mail to a lecturer, or perhaps to a queue set up for the purpose on server 19 or another server dedicated for the purpose. In the real-time case the lecturer may deal with questions in real time on-line. To avoid overwhelming the lecturer in the real-time case, the number of recipients may be limited.

A button labeled Eval is provided and adapted to allow a lecture recipient to request an impromptu evaluation or practice test on what he or she has learned from the lecture. Such an evaluation may be pre-prepared by a lecturer and stored in server 19 is association with a specific lecture. A recipient may fill out the evaluation and send it back to server 19 for grading by the lecturer, or by an automated system. The evaluation option may also be used by a recipient to request an on-line evaluation for the purpose of advancing to a higher level class, or perhaps for pre-testing out of a planned lecture.

A button labeled Config is provided and adapted to allow a lecture recipient to configure the appropriate PC platform and software parameters in order to optimize lecture delivery and presentation success. For example, if a lecture recipient has upgraded to a more advanced multimedia player, he or she may indicate the version and brand of the player to server 19 such that the multimedia portions of a lecture may be streamed in that format. If a lecture recipient plans to receive a lecture in another platform such as Apple™, then the appropriate indications may be sent to server 19 through the configuration option.

A button labeled Test is provided and adapted to allow a lecture recipient to test aspects of his or her PC capability related to receiving a lecture such as bandwidth capability, microphone capability, sound and video system, or other parameters. A button labeled send is provided and adapted to allow a lecture recipient to send certain data to server 19 or, in some cases to a lecturer. Such data might include payment to a lecturer for a commercial lecture received payment for on-line books or other reference material, comments, or the like.

A button labeled Pause is provided and adapted to allow a lecture recipient to pause a lecture in progress in order to perform some other required task such as answer a telephone, use a bathroom, get a cup of coffee, etc. When a lecture is paused, the connection a lecture server such as server 19 remains open such that hitting pause again resumes download of the lecture at the point where it was paused. This option is, of course not available with the real-time version.

In a preferred embodiment, enhancements to browser window 47 effected by software plug-in 33 of FIG. 1 offer much less control than the parent enhancement represented by software 35 (FIG. 1) and browser window 37 (FIG. 2) afforded to a lecturer. This is so that a lecturer such as a teacher, for instance, may have some control over his on-line class. However, in other embodiments, more control may be afforded to lecture recipients without departing from the spirit and scope of the present invention. For example, a lecture recipient may be allowed to create or modify his own lecture to present to other classmates. Such a lecture may be a book report, presentation on what was learned in class, or some other required report. In this case, appropriate tools such as those represented in FIG. 2 may be afforded to software 33 (FIG. 1) and be presented on such as an additional tool bar in browser window 47.

It will be apparent to one with skill in the art that the enhancements provided by virtue of software instances 35 (lecturer) and 33 (lecture recipient) may be provided in the form of a browser plug-in as described in preferred embodiments, or may be provided as standalone programs that integrate with certain browser functions. In another embodiment, such enhancements may be held on-line and only available when a lecturer or lecture recipient is connected to a server providing the software such as server 19 of FIG. 1.

Figure 4:
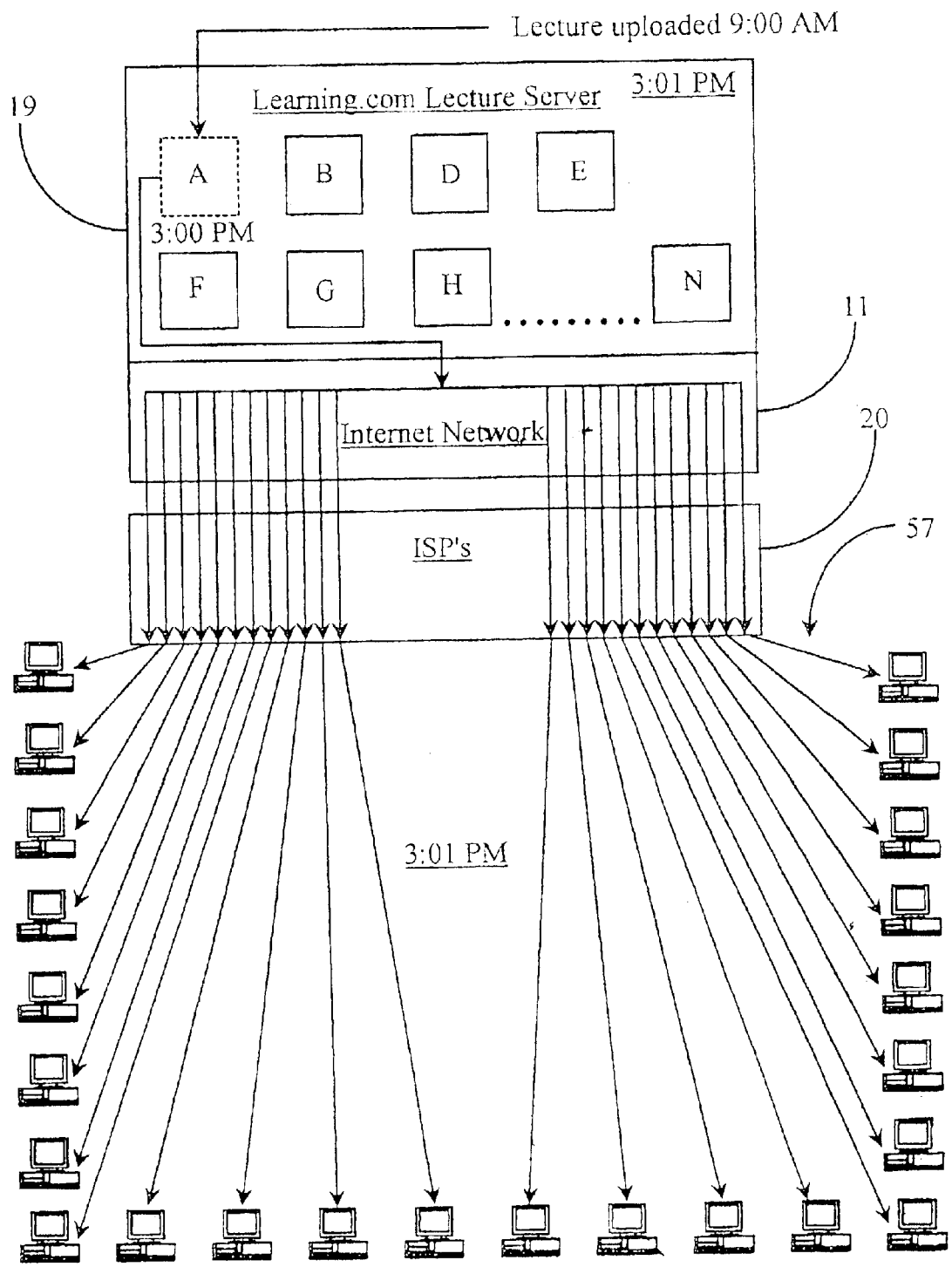
FIG. 4 is a block diagram illustrating a scheduled execution and pushed delivery of an Internet-based lecture according to an embodiment of the present invention.

FIG. 4 is a block diagram illustrating execution and delivery of an Internet-based lecture from server 19 according to an embodiment of the present invention. Server 19, in this example stores deliverable lectures A–N. Lectures A–N may all be scheduled for delivery to different recipients at different times. There may be more than one server available to store and serve lectures without departing from the spirit and scope of the present invention. For example, a large learning institution such as a college may reserve a single server for presenting their material. Teachers and students belonging to the institution will all subscribe to the same server. In another embodiment, one server may be used for a variety of lecturers from different institutions including independent operators. There are many varied possibilities.

Server 19, which is a lecture server hosted, in this example by a service referred to as Learning.com by the inventor, may be a single server or many connected servers adapted to practice the present invention. In this example, lecture A was created by virtue of plug-in 35 (FIG. 1) and uploaded by a lecturer at 9:00 AM. The lecturer has programmed lecture A to execute at 3:00 PM, perhaps on the same day. Lecture A, instead of being programmed to execute at a certain time, may simply be stored for recipients to access at any convenient time. However, in this instance, lecture A will automatically execute at exactly 3:00 PM. Moreover, the practice of requiring a minimum student body is more sparing of certain hardware resources.

It is presumed in this example that notification regarding the impending execution of lecture a has already been sent to target recipients represented by element number 57 and illustrated as a plurality of computer icons. At 3:00 PM, lecture A executes and is delivered through Internet network 11 along individual connections represented by downward arrows to ISP's 20 at the PSTN level. ISP 20 is representative of all of the Internet connection schemes used by all of the recipients. The downward connection arrows at the ISP level represent individual modem Internet connections to server 19 and to recipients 57 through the PSTN network, or by any other data link, as illustrated by the expansion of the connecting arrows to each individual recipient icon.

At 3:01 PM all of recipients 57 are actively participating in the receipt of lecture A. In this example, there are 24 recipients 57 participating in the presentation of lecture A. In other embodiments there may be more or fewer recipients 57 participating. The random number 24 simply illustrates a viable class size for a teacher giving lecture A. At 3:00 PM, the lecturer who authored lecture A may be playing golf or skiing with the knowledge that his or her class is being taught.

It will be apparent to one with skill in the art that the method and apparatus of the present invention may be practiced on a local or international scale without departing from the spirit and scope of the present invention. For example, recipients 57 may be spread geographically in separate countries. Time differences and language conversion may be performed at server 19 in accordance with student parameters. In most embodiments, recipients 57 will be using varied connection schemes, different Internet access programs, ISP's and perhaps, different technologies for accessing the Internet. For example, some recipients 57 maybe accessing from wireless laptop computers while others are using a modem and a phone line. Appropriate parameters may be pre-configured at server 19 and stored for recipients in such as repository 21 (FIG. 1).

The method and apparatus of the present invention may be tailored to virtually any type of speaker/audience environment including but not limited to education, commercial seminars, sales meetings, political forums or speeches, etc. In some cases lecturers may, instead of using public domain WEB pages, create their own on-line lecture pages as may be required depending on content. In other instances, a combination of public domain pages and created pages may be used. For example, a politician giving a speech may provide many of his or her own lecture pages, but may also link to or include some public domain pages into the on-line speech. Such public pages may be a published accounting of a rivals campaign financing or the like.

It will be readily apparent to one with skill in the art that the method and apparatus of the present invention is extremely versatile and therefore should be afforded the broadest scope. The spirit and scope of the present invention is limited only by the claims that follow.

What is claimed is:

1. An Internet connected presentation server, comprising:

a facility storing information to be streamed to authorized recipients having Internet appliances capable of receiving and presenting the information to be streamed; and a facility storing Internet addresses of the authorized recipients;

wherein at a pre-selected time, the server gains control of individual ones of the Internet appliances associated with the authorized recipients and streams the information.

\* \* \* \* \*